US008660713B2

(12) United States Patent
Khatwa et al.

(10) Patent No.: US 8,660,713 B2
(45) Date of Patent: Feb. 25, 2014

(54) METHODS AND SYSTEMS FOR AN IMPROVED IN-TRAIL PROCEDURES DISPLAY

(75) Inventors: Ratan Khatwa, Sammamish, WA (US); Santosh Mathan, Seattle, WA (US); Olukayode Olofinboba, Eden Prairie, MN (US)

(73) Assignee: Honeywell International Inc., Morristown, NJ (US)

( * ) Notice: Subject to any disclaimer, the term of this patent is extended or adjusted under 35 U.S.C. 154(b) by 587 days.

(21) Appl. No.: 12/912,183

(22) Filed: Oct. 26, 2010

(65) Prior Publication Data

US 2011/0282568 A1 Nov. 17, 2011

Related U.S. Application Data

(60) Provisional application No. 61/345,424, filed on May 17, 2010.

(51) Int. Cl.
*G01C 23/00* (2006.01)

(52) U.S. Cl.
USPC .......... 701/3

(58) Field of Classification Search
USPC .......... 701/3, 4, 7, 9, 13, 18, 121, 122
See application file for complete search history.

(56) References Cited

U.S. PATENT DOCUMENTS 5,383,098 A 1/1995 Ma et al.
5,682,291 A 10/1997 Jeffries et al.
6,289,277 B1 9/2001 Feyereisen et al.
6,389,355 B1 * 5/2002 Gibbs et al. .......... 701/467
6,433,729 B1 8/2002 Staggs
6,507,377 B1 1/2003 Jung
6,616,106 B1 9/2003 Dean et al.
6,654,078 B1 11/2003 Kato et al.
6,894,739 B2 5/2005 Sung et al.
7,004,614 B2 2/2006 Tsai et al.
7,236,357 B2 6/2007 Chen
7,429,700 B2 9/2008 Kanamaru et al.
7,471,995 B1 12/2008 Robinson
7,525,795 B2 4/2009 Cheng
7,570,178 B1 * 8/2009 Whalen et al. .......... 340/961

(Continued)

FOREIGN PATENT DOCUMENTS

EP 1947624 A1 7/2008
EP 2071542 A2 6/2009
EP 2159544 A1 3/2010

OTHER PUBLICATIONS

Search Report from counterpart European application No. 11155504.1, dated Feb. 18, 2013, 3 pp.

(Continued)

*Primary Examiner* — Kim T Nguyen
(74) *Attorney, Agent, or Firm* — Shumaker & Sieffert, P.A.

(57) ABSTRACT

Systems and methods for improving situational awareness on an in-trail procedures display. The present invention provides a display with visual identification and indication for aircraft that do not meet the ITP criteria. In the in-trail procedures display, feedback is provided when a pilot selects an invalid ITP flight level, unambiguous feedback is provided to the pilot upon selection of a valid flight level, and valid inter-target aircraft located in intervening flight levels after selection of a valid flight level are positively identified and invalid target aircraft for selection are uniquely identified.

20 Claims, 14 Drawing Sheets

(56) References Cited

U.S. PATENT DOCUMENTS

| | | | |
|---|---|---|---|
| 7,570,313 | B2 | 8/2009 | Wu et al. |
| 7,642,452 | B2 | 1/2010 | Kanazawa et al. |
| 7,646,313 | B2 | 1/2010 | Winkler et al. |
| 7,712,621 | B2 | 5/2010 | Cho et al. |
| 7,940,287 | B2 | 5/2011 | Kim et al. |
| 8,101,859 | B2 | 1/2012 | Zadesky |
| 2003/0006928 | A1 | 1/2003 | Szeto et al. |
| 2003/0048204 | A1 | 3/2003 | Qureshi |
| 2003/0193410 | A1 | 10/2003 | Chen et al. |
| 2005/0049762 | A1 | 3/2005 | Dwyer |
| 2006/0146486 | A1 | 7/2006 | Wikstrom et al. |
| 2006/0227502 | A1 | 10/2006 | Cheng |
| 2007/0052100 | A1 | 3/2007 | Bellinger |
| 2007/0200731 | A1 | 8/2007 | Winkler et al. |
| 2008/0013087 | A1 | 1/2008 | Bailey et al. |
| 2008/0048958 | A1 | 2/2008 | Kim et al. |
| 2008/0158810 | A1 | 7/2008 | Liu et al. |
| 2008/0247127 | A1 | 10/2008 | Finnegan |
| 2009/0037037 | A1 | 2/2009 | Mettes |
| 2009/0152415 | A1 | 6/2009 | Yang et al. |
| 2010/0030401 | A1 | 2/2010 | Rogers et al. |
| 2010/0057362 | A1 | 3/2010 | Schilke et al. |
| 2010/0194628 | A1 | 8/2010 | Christianson et al. |
| 2010/0286900 | A1 | 11/2010 | Depape et al. |
| 2010/0332054 | A1 | 12/2010 | Brandao et al. |
| 2011/0006918 | A1 | 1/2011 | Shafaat et al. |
| 2011/0144833 | A1 | 6/2011 | Tjorhom et al. |
| 2011/0209376 | A1 | 9/2011 | Kinno |
| 2011/0257874 | A1 | 10/2011 | Judd et al. |
| 2011/0270472 | A1 | 11/2011 | Shafaat et al. |
| 2011/0270473 | A1 | 11/2011 | Reynolds et al. |
| 2011/0295450 | A1 | 12/2011 | Boorman et al. |
| 2012/0004793 | A1 | 1/2012 | Block |
| 2012/0102422 | A1 | 4/2012 | Letsu-Dake et al. |
| 2012/0179307 | A1 | 7/2012 | Boorman et al. |
| 2012/0203448 | A1 | 8/2012 | Pepitone et al. |

OTHER PUBLICATIONS

Examination Report from counterpart European application No. 11155504.1, dated Jul. 26, 2013, 9 pp.

Response to Examination Report dated Jul. 23, 2013, from counterpart European application No. 11155504.1, filed Nov. 20, 2013, 14 pages.

* cited by examiner

*FIG.3* *(Prior Art)*

METHODS AND SYSTEMS FOR AN IMPROVED IN-TRAIL PROCEDURES DISPLAY

PRIORITY CLAIM

This application claims the benefit of U.S. Provisional Application Ser. No. 61/345,424 filed May 17, 2010, which is hereby incorporated by reference.

GOVERNMENT INTEREST

The invention described herein was made in the performance of work under U.S. Government Contract No. DTFAWA-09-A-0001 with the FAA. The Government may have rights to portions of this invention.

BACKGROUND OF THE INVENTION

Efficient oceanic operations normally require flight level changes. Climbs or descents provide optimal performance to take advantage of favorable winds or to avoid turbulence.

Current oceanic operations limit opportunities for flight level changes for a number of reasons:

- Flights operate along same routes at about the same time (locally dense traffic);
- Reduced surveillance performance (compared with radar) results in large separation minima for safe procedural separation.

Automatic dependent surveillance-broadcast (ADS-B) in-trail procedures (ITP) are airborne ADS-B enabled climbs and descents through otherwise blocked flight levels. ITP is based on an approved International Civil Aviation Organization (ICAO) procedure whereby a controller separates aircraft based on information derived from cockpit sources that is relayed manually by the flight crew.

ITP allows a leading or following aircraft on the same track to climb or descend to a desired flight level through flight levels occupied by other aircraft. An ITP display enables a flight crew to determine if specific criteria for an ITP are met with respect to one or two reference aircraft at intervening flight levels. These criteria ensure that the spacing between the estimated positions of the ITP aircraft and reference aircraft always exceeds the ITP separation minimum of 10 NM, while vertical separation does not exist during the climb or descent. Once the flight crew has established that the ITP criteria are met, they request an ITP climb or descent, identifying any reference aircraft in the clearance request. Air Traffic Control (ATC) must determine if standard separation will be met for all aircraft at the requested flight level—and at all flight levels between the initial flight level and requested flight level. If so, a standard (non-ITP) flight level change clearance is likely to be granted. Otherwise, if the reference aircraft are the only blocking aircraft, the controller evaluates the ITP request. ATC determines if the reference aircraft have been cleared to change speed or change flight level, or are about to reach a point at which a significant change of track will occur. The controller also ensures that the requesting aircraft is not referenced in another procedure. ATC also ensures that the positive Mach difference with the reference aircraft is no greater than 0.06 Mach. If each of these criteria is satisfied, then ATC may issue the ITP flight level change clearance.

An example of an ITP climb is shown in FIGS. 1 and 2. An ITP aircraft is behind a reference aircraft that is at a higher intervening flight level (FL350). Standard air traffic control (ATC) procedures apply to the other aircraft (two aircraft at FL360 and one at FL350).

The ITP system displays the information derived from received ADS-B data on traffic displays such as a cockpit display of traffic information (CDTI). Both plan-view and vertical situational awareness displays (VSAD) are possible, see FIG. 3. These displays require a large amount of pilot workload when preparing an ITP clearance request.

SUMMARY OF THE INVENTION

The present invention provides systems and methods for improving situational awareness on an in-trail procedures display. The present invention provides a display with visual identification and indication for aircraft that do not meet the ITP criteria. In the in-trail procedures display, feedback is provided when a pilot selects an invalid ITP flight level, unambiguous feedback is provided to the pilot upon selection of a valid flight level, and valid inter-target aircraft located in intervening flight levels after selection of a valid flight level are positively identified and invalid target aircraft for selection are uniquely identified.

In one aspect of the invention, automatic selection of valid target aircraft and automatic generation of a clearance request text based on manually or automatically selected valid target aircraft and a desired flight level are available.

BRIEF DESCRIPTION OF THE DRAWINGS

Preferred and alternative embodiments of the present invention are described in detail below with reference to the following drawings.

DETAILED DESCRIPTION OF THE INVENTION

Figure 1:
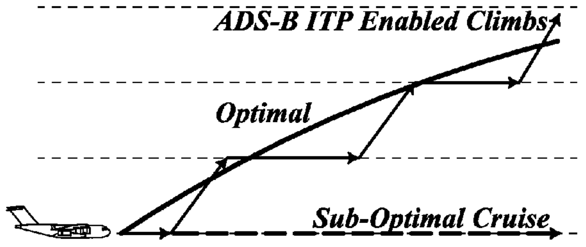
FIG. 1 (Prior Art)
FIGS. 1 and 2 illustrate side views of an aircraft performing altitude changes during oceanic flight operations.
Figure 2:
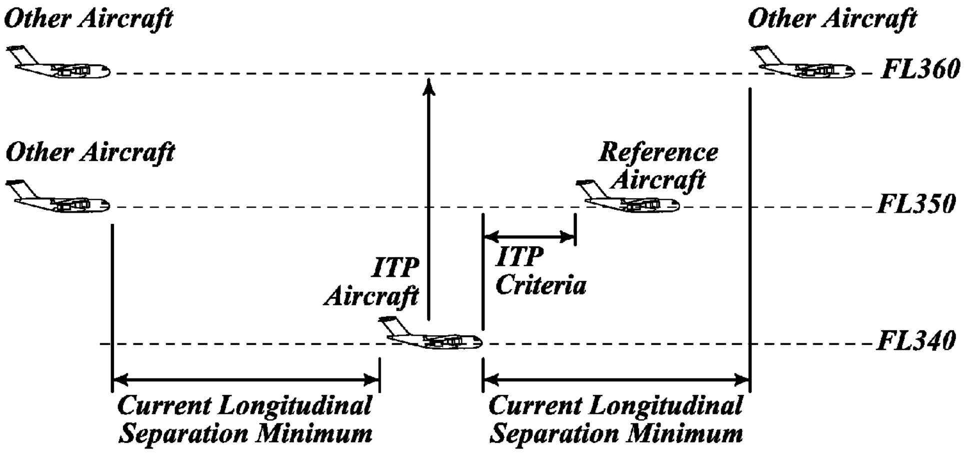
FIG. 2 (Prior Art)
Figure 3:
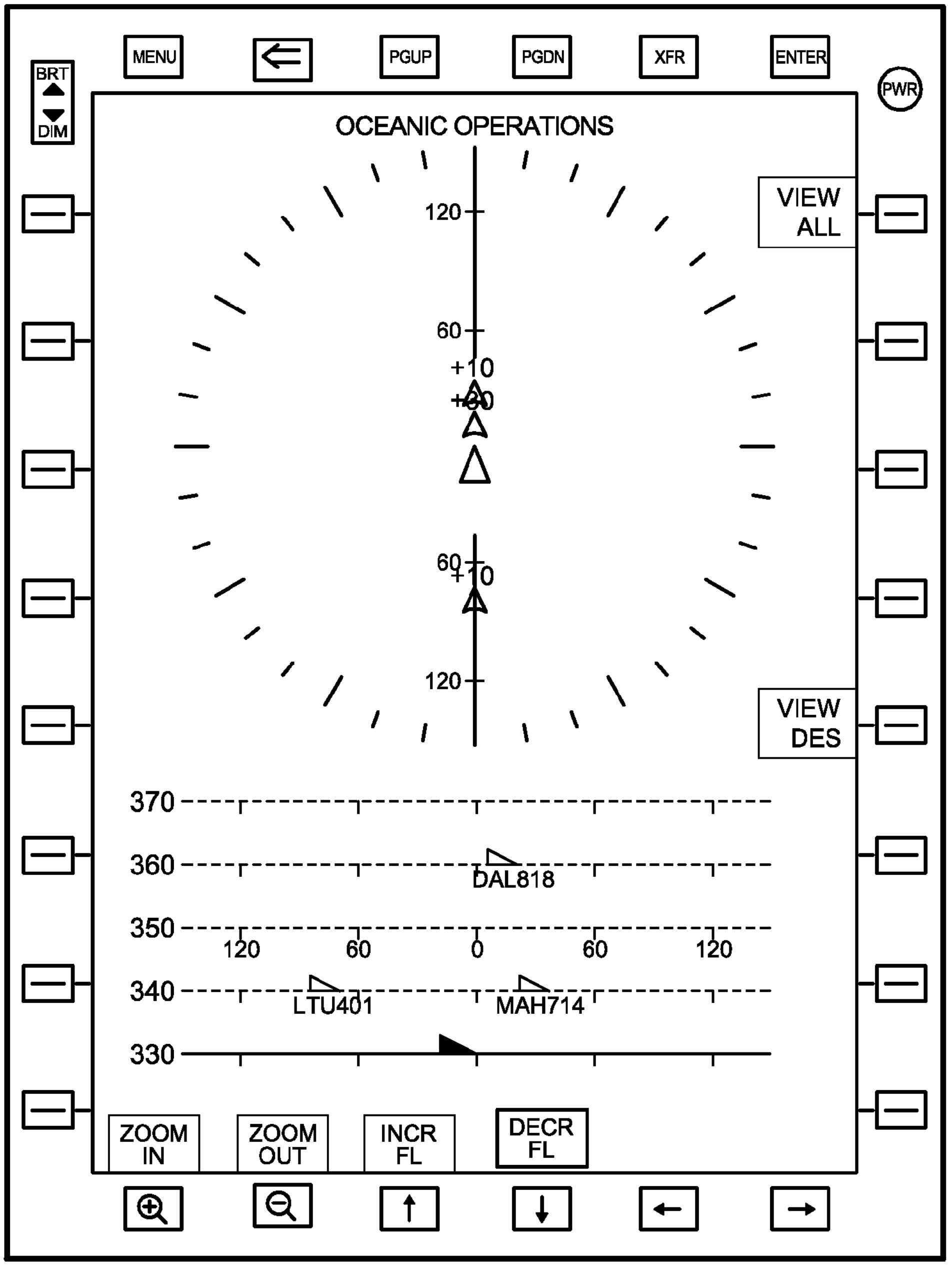
FIG. 3 illustrates an in-trail procedure (ITP) display formed in accordance with the prior art.
Figure 4:
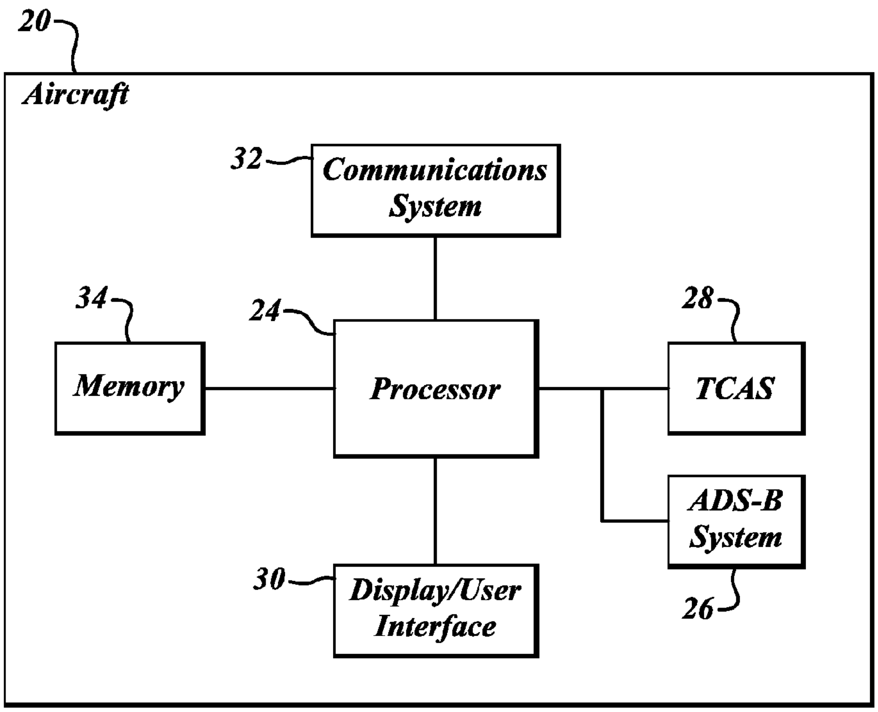
FIG. 4 illustrates a schematic diagram of a system formed in accordance with an embodiment of the present invention.

FIG. 4 illustrates an embodiment of a system on an aircraft 20 for providing improved in-trail procedures (ITP) functionality. The exemplary system includes a processor 24, automatic dependent surveillance-broadcast (ADS-B) system 26, a traffic collision avoidance system (TCAS) 28 (optional), a display device 30, a communications system 32, and memory 34. The processor 24 may be connected to other aircraft systems, such as a Global Positioning System (GPS) or comparable device, for retrieving various flight information (e.g., position information).

In another embodiment, a transponder is connected to the TCAS and the ADS-B device is integrated within the TCAS unit.

The processor 24 receives target information of other aircraft in the vicinity of the aircraft 20 via the ADS-B system 26 and, if included, the TCAS 28. In another embodiment, a TCAS unit includes the ADS-B functionality and this processor 24 is included in the TCAS unit. The processor 24 presents the received target information on the display device 30.

Pilots interact with the display device 30 using a user interface, such as a cursor control device or a touch screen display, for analyzing and sending an ITP change of altitude request to a controller authority via the communications system 32. This will be shown in more detail below and in the following figures.

The following features are provided by the system in FIG. 4:

- Any aircraft that does not meet the ITP criteria are visually identified and an indication is provided to identify the elements of the ITP criteria that were not met;
- A groundspeed differential indicator on the ITP view clearly provides information on whether other traffic is converging or separating from ownship;
- Feedback is provided when a pilot selects an invalid ITP flight level;
- A standard climb/descent indication is identified if the pilot requests an ITP clearance and a standard clearance applies;
- Unambiguous feedback is provided to the pilot upon selection of a valid flight level;
- Valid inter-target aircraft located in intervening flight levels after selection of a valid flight level are positively identified and invalid target aircraft for selection are uniquely identified;
- Automatic selection of valid target aircraft is available;
- Selection of target aircraft that do not meet valid ITP target aircraft criteria is not allowed;
- Automatic generation of a clearance request text based on manually or automatically selected valid target aircraft and a desired flight level;
- Automatic transmission of ITP clearance request to air traffic control (ATC); and
- Graphical, textual and/or audible advisories are presented to the flight crew after an ITP clearance has been requested and one of the selected target aircraft fails to satisfy the ITP criteria.

Figure 5:
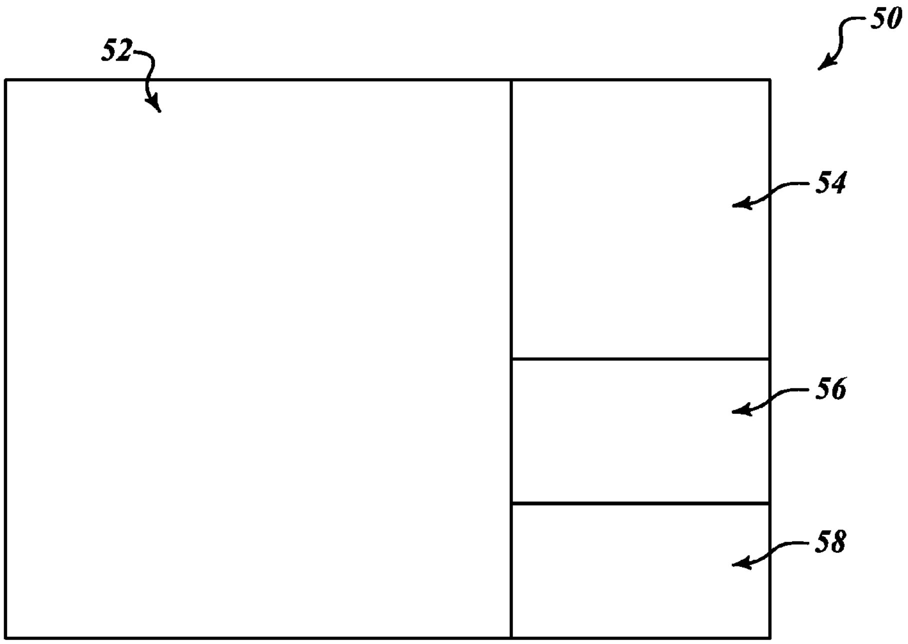
FIG. 5 illustrates sections of an ITP display formed in accordance with an embodiment of the present invention.

FIG. 5 illustrates an exemplary display 50 that is segmented into various sections for presenting useful information for the pilots. The sections of the display 50 include a main display section 52, an ITP guidance section 54, a traffic status section 56, and an ITP advisory message section 58. The main display section 52 allows a pilot to switch between a plan view and an ITP view. The ITP view is comparable to a vertical profile display except that the relative distances of the displayed traffic (i.e. icons) are ITP distances. The ITP distance is the distance between the host aircraft and the target aircraft as defined by the difference in distance to an aircraft calculated common point along a projection of each aircraft's track in front of or behind the aircraft as appropriate.

The ITP guidance section 54 presents the pilot with all the steps necessary for executing an ITP request. This will be described in more detail below. The traffic status section 56 provides various information about traffic targets that are selected by the pilot or automatically selected by the processor 24 in the main display section 52. This will be shown in more detail by example in the following figures. The ITP advisory message section 58 provides pilots information relating to selections they made within the main display section 52 if the action that the pilot is performing is unavailable or invalid. The sections 52-58 may be distributed on the display in a different manner.

Figure 6:
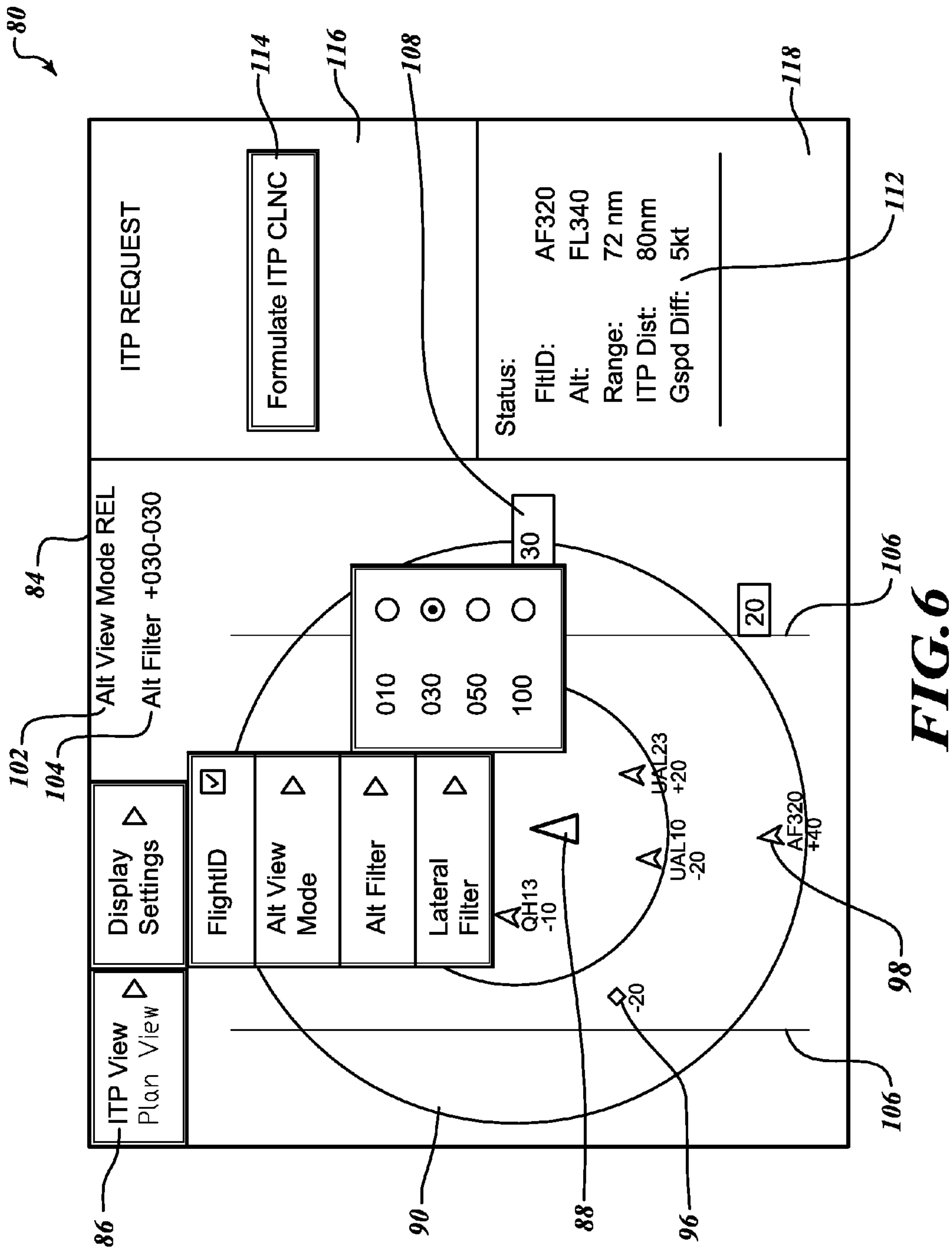
FIGS. 6, 7 and 9-16 are screen shots of an exemplary ITP display formed in accordance with an embodiment of the present invention.

FIG. 6 illustrates a display 80 that is presently in plan view display mode. In this embodiment, the display 80 is a touch screen display that allows a user to select from various menu items, buttons, icons, etc. for presenting related information. In the alternative, a cursor control device, such as a mouse may be used for selecting displayed linked items. A main section 84 of the display 80 presents a plan view with a host aircraft icon 88 shown in the center of one or more radius rings 90. In the upper left corner of the main section 84 is a selectable indicator that shows the present view mode. The user can alter what is displayed in the main section 84 by activating an arrow icon (menu selection button) that is adjacent to the view mode indicators/selector. Upon selection of the icon adjacent to the view mode indicators a column of user selectable display attributes may be set by the user. The display attributes include (but are not limited to): flight identification information (ID), altitude view mode, altitude filter and lateral filter settings. The display allows users to filter visible traffic by setting the visible altitude band above and below the aircraft (by means of an altitude filter). In one embodiment, conventional TCAS altitude filters (NORMAL, ABOVE, BELOW) are also included in the ALT Filter menu. 15 NM Lateral Filter allows the pilot to declutter the ITP View (the traffic filtering is not performed on the Plan View Display—but 15 NM reference lines are depicted once the Lateral Filter is engaged). Both relative and absolute altitude display modes can be selected by using the ALT VIEW MODE menu selections. The Flight ID menu item allows the user to select display of the traffic ID for all traffic being displayed on the Plan View display. Altitude filtering is described in corresponding U.S. patent application Ser. No. 12/774,513 filed May 5, 2010, which is hereby incorporated by reference.

The processor 24 generates icons to be displayed in the plan-view display relative to the host aircraft icon 88 based on TCAS or ADS-B information received from an associated target aircraft. In an alternative embodiment, traffic targets from other data sources such as TIS-B (Traffic Information Services-Broadcast) could also be processed and displayed. Target aircraft that are outside of the defaulted or user selected altitude and lateral filter settings are not displayed as icons in the main section 84 of the plan view or the ITP view. The altitude filters for plan view and ITP view may be independent in some embodiments (i.e., user selects different altitude filter values for the two views). A first target icon 96 is associated with a TCAS target aircraft and a second target icon 98 is associated with an ADS-B target aircraft. Each of these target icons 96, 98 include a relative altitude value that is a value of altitude relative to the host aircraft. The ADS-B icons also present flight ID information if that display feature is selected. Also displayed within the main section 84 is an altitude view mode enunciator 102, values associated with an altitude filter 104, and lateral filter lines 106 with an associated lateral filter distance value. The altitude view mode enunciator 102 provides visual feedback to the user of the active altitude filter selection. It also indicates whether the user selected relative or absolute altitude. The lateral filter lines 106 indicate the extent of lateral filter selected. Only traffic between these lines is shown in the ITP view (i.e., the traffic is not filtered from the plan view).

A status section 112 provides various information about target icons that are selected (e.g., user's finger touching target icon on touch screen) within the main section 84. In one embodiment, the status information includes, but is not limited to, flight ID, altitude, range, ITP distance and ground speed differential. An ITP advisory message section 118 presents information when a user action is unavailable or invalid.

Figure 7:
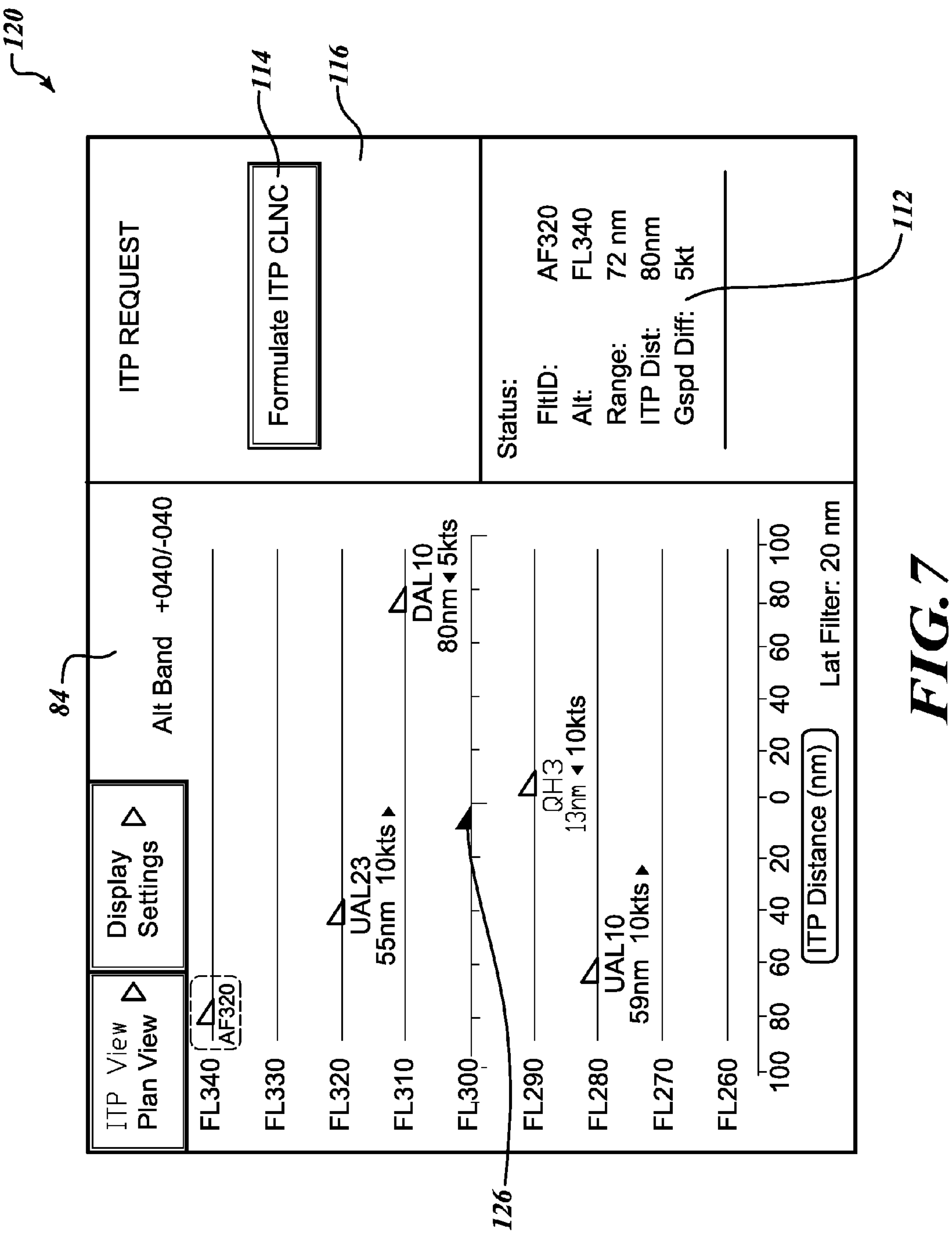

Transition to the ITP view can occur by either selecting the ITP view text located in a view mode section 86 of the main section 84 or by activation of a Formulate ITP clearance (CLNC) button 114 located in an ITP procedural guidance section 116. Selection of either one of those transitions the display to ITP view 120 shown in FIG. 7. In the ITP view the main section 84 presents a vertical profile view showing flight levels on a vertical axis. Each flight level includes a corresponding line. ITP distance is presented on a horizontal axis with a host aircraft icon 126 located on a center flight level and at zero on the ITP distance scale. This vertical profile display or ITP view 120 shows all target aircraft that are above or below the host aircraft. In this example the target aircraft icons are associated with aircraft that fall within the altitude band. In this example the altitude band is shown in the upper right corner of the main section 84. The altitude filter is plus and minus 4000 feet. If a lateral filter selection was made then a read-out that indicates the current lateral filter would be displayed. In this example, a lateral filter of 20 NM is displayed in the bottom right corner of the main section 84.

Figure 8:
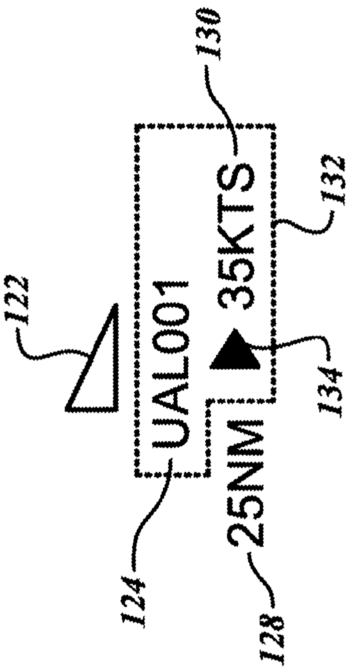
FIG. 8 illustrates a target icon with associated data.

If a target aircraft (an aircraft symbol 122) is produced from ADS-B information, the associated icons with the aircraft symbol 122 include traffic tag data (see FIG. 8). The traffic tag data includes flight ID 124, ITP distance 128, and/or speed differential relative to the host aircraft 130. ITP distance information may be optionally or additionally shown by an ITP distance scale located at the bottom of the main section 84. A groundspeed differential arrow 134 is included with the traffic tag data. The groundspeed differential arrow 134 provides information on whether other traffic is converging or separating from ownship. When the groundspeed differential arrow 134 points to the right, it indicates that the traffic is faster than ownship, and the converse is true. A solid groundspeed differential arrow 134 indicates that the traffic is converging on ownship, whereas a hollow groundspeed differential arrow 134 indicates that the traffic is separating from ownship. A dotted box surrounds or some other indicator distinguishes an aircraft icon when the user selects that icon. Selection of the aircraft icon presents status information for that target aircraft in the traffic status section 112, see the dotted box around the icon AF320 in FIG. 6. Selection can be performed by touching or tapping the desired icon with a finger or pointing device. In one embodiment, the current flight level of the host aircraft is uniquely identified from all the other flight level lines. In this embodiment, the current flight level for the host aircraft is indicated in magenta. It can be appreciated that other colors or graphical representations may be used.

Target aircraft icon that do not satisfy ITP minimum criteria are highlighted in a distinct color, e.g. blue. In an alternative embodiment, only the failing ITP criteria of the traffic tag data are highlighted in a distinct color (i.e. not the aircraft symbol).

Figure 9:
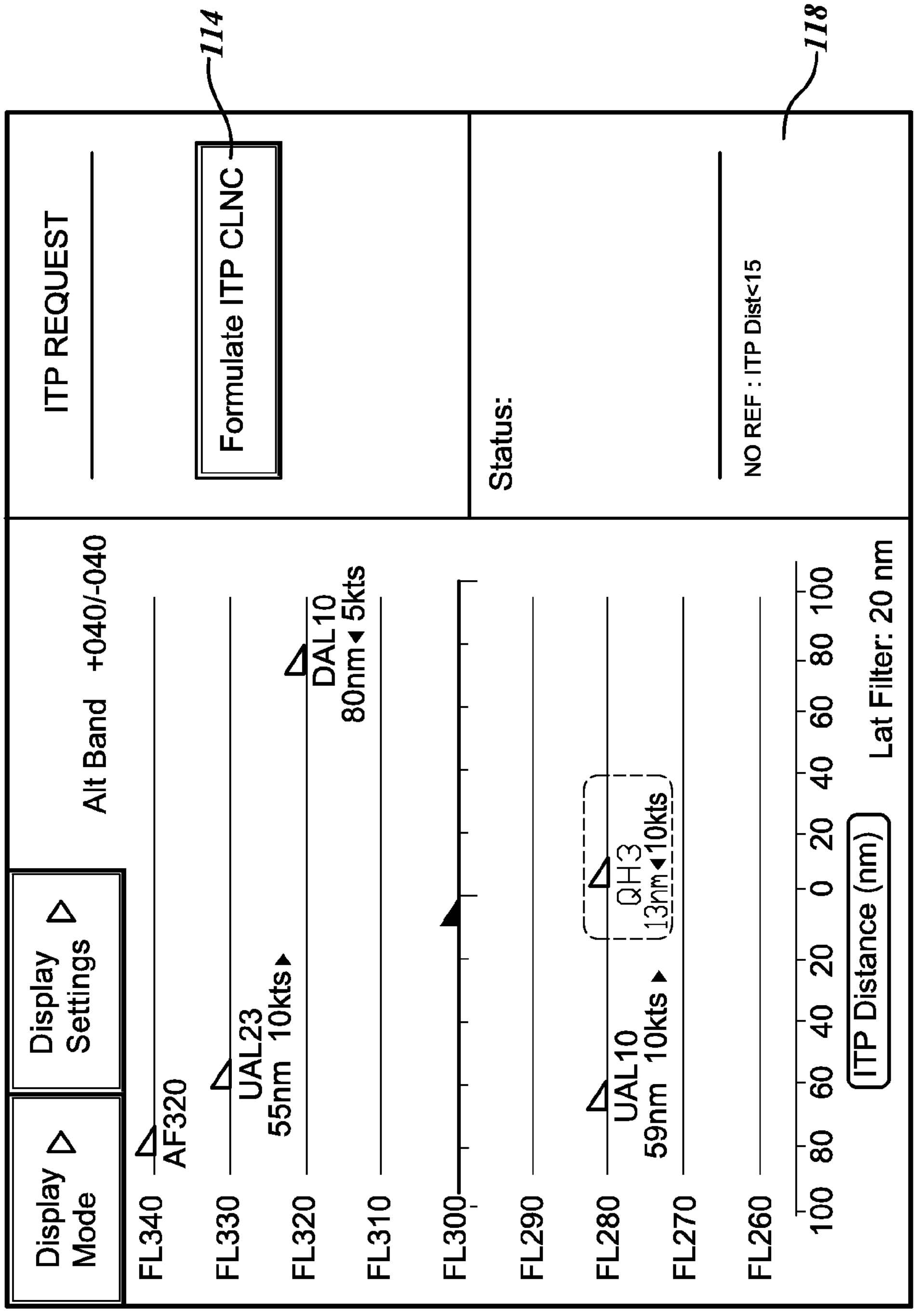

As shown in FIG. 9, the user has selected icon QH3 which was visually identified to not satisfy ITP minimum criteria. The advisory message section 118 indicates why the aircraft associated with icon QH3 does not meet the ITP minimum criteria. Icon QH3 does not meet the ITP criteria because the ITP distance is less than 15 nautical miles.

Figure 10:
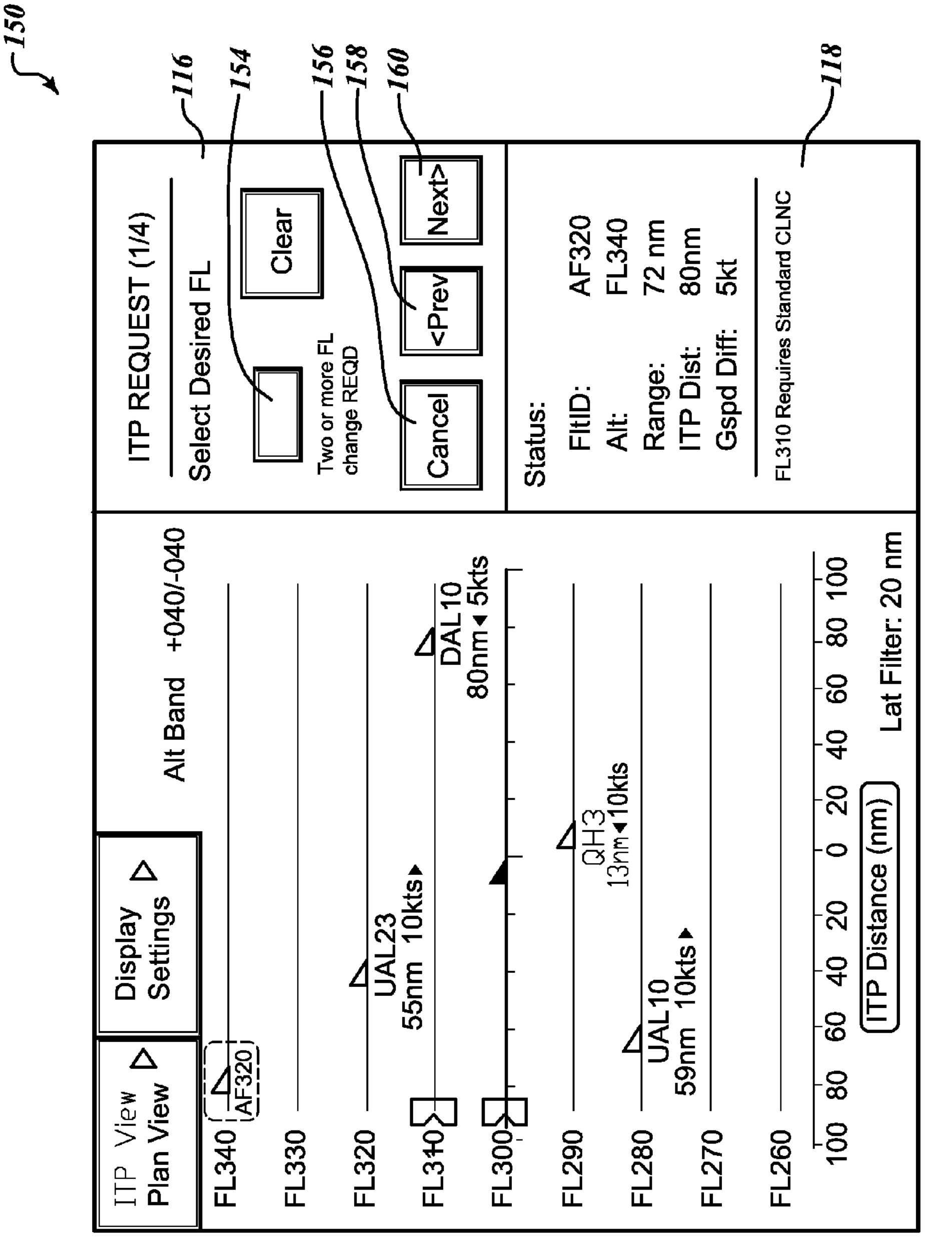

The ITP procedural guidance section 116 provides the user with a four-step process to formulate a correct ITP clearance that needs to be sent to ATC. FIG. 10 illustrates a display 150 after the user has selected the Formulate ITP CLNC button 114 while in the ITP view mode and after the user has selected flight level (FL) 310 for attaining an ITP clearance. Because the user selected a flight level that is only a 1000 feet above the current flight level of the host aircraft, the line associated with flight level 310 and a caret located at a left end of the line associated with the selected flight level are presented in grey. An advisory message is presented in the advisory message section 118 because the processor 24 determined that because the selected flight level is only 1000 feet above the flight level of the host aircraft, an ITP clearance request is not needed. In this situation, all that is required is a standard clearance. In the ITP guidance section 116 a selected desired flight level (FL) box 154 is displayed above a Cancel button 156, a Prev(ious) view button 158, and a Next view button 160. Selection of the Prev(ious) view and Next view buttons 158, 160 are comparable to forward and back browser window transition buttons. The Cancel button 156 allows the user to cancel a current ITP request formulation. Because the selected FL 310 is not valid or does not require an ITP request, the selected flight level value is not inserted into the desired FL box 154. In an alternative embodiment, the (incorrect) selected flight level value is entered in grey (i.e., a color different than if the selected flight level value was valid) in the desired FL box 154.

Figure 11:
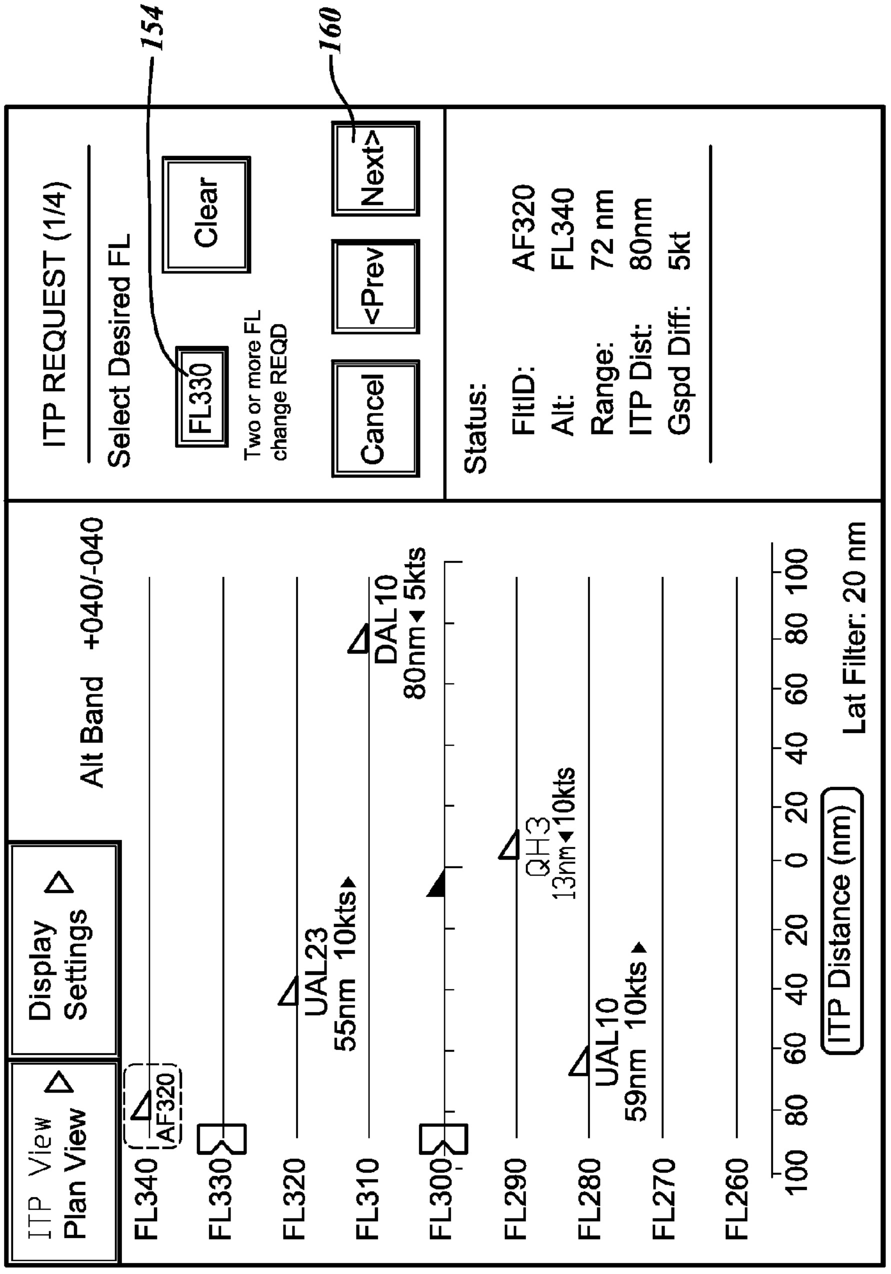

As shown in FIG. 11, the user has selected FL 330 as the desired flight level for an ITP climb. The processor 24 determines that the selected FL 330 is valid and then unambiguously indicates the validity of FL 330. In this example, a caret is presented on the left side of a line associated with FL 330 and both the line and the caret are presented in green. Because the selected FL 330 is valid, it is automatically entered into the selected desired FL box 154. The user then selects the Next view button 160 for continuing the ITP request process.

Figure 12:
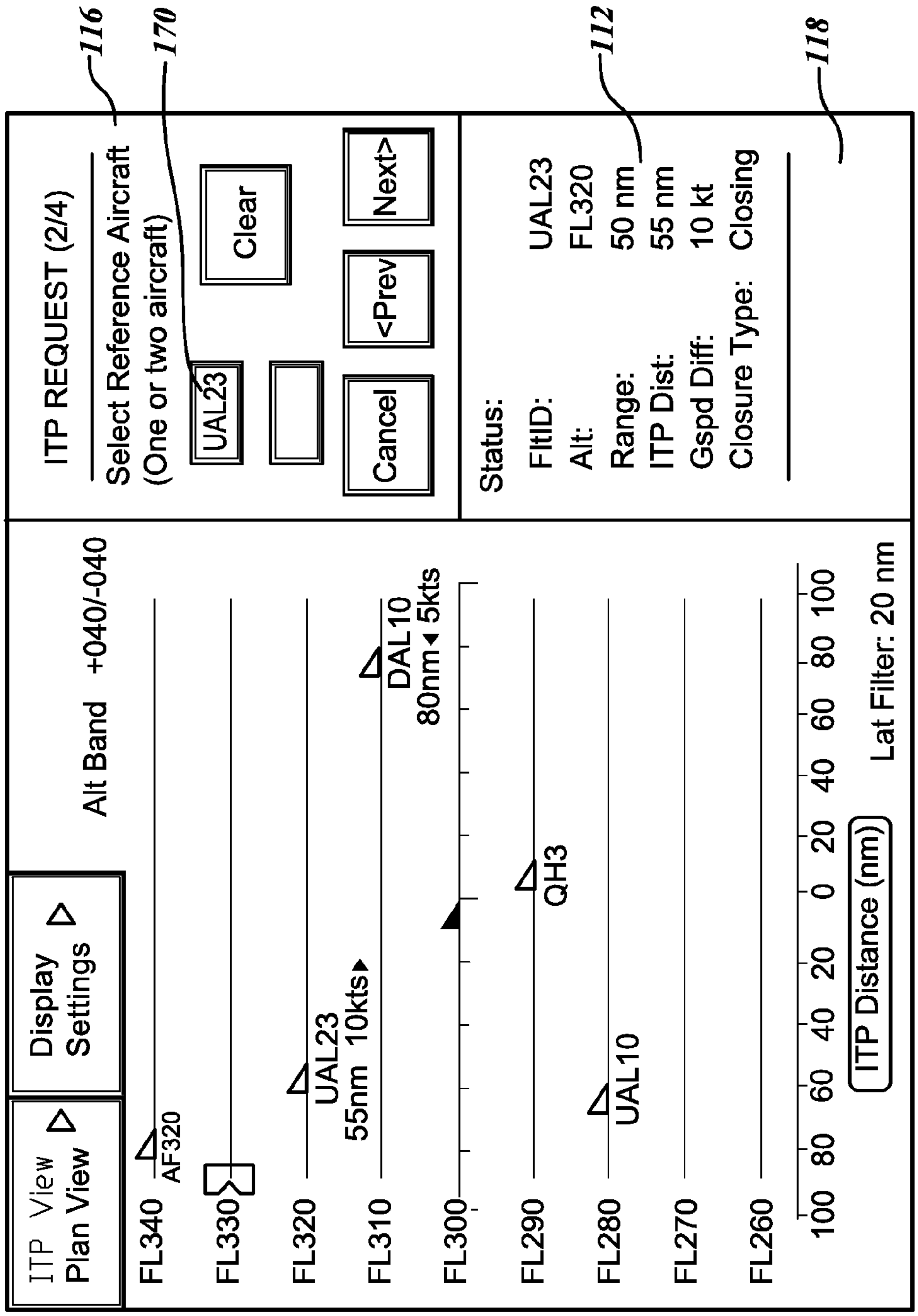

FIG. 12 shows step 2 of the ITP request process. In step 2, a user is requested to manually select one or two reference aircraft that are located between the host aircraft's current flight level and the selected flight level. In this example, the user selects aircraft UAL23 as the first aircraft. The flight ID information for the selected aircraft is automatically populated into a reference aircraft window 170 located in the ITP clearance section 116. Upon selection, status information for the selected aircraft UAL23 is automatically inserted into the status section 112. Valid reference aircraft selections are highlighted by use of color (e.g., green) in the window 170. Because the selected aircraft UAL23 is a valid reference aircraft according to an ITP clearance request, no advisory messages are presented in the advisory message section 118. In one embodiment the valid reference flight ID in the traffic status area could also be highlighted by a color change, e.g. green. The valid aircraft icons (i.e., meeting ITP initiation criteria such as groundspeed differential, ITP distance and relative altitude) located between the selected flight level and the current flight level of the host aircraft are identified in white. Icons associated with aircraft that do not meet the ITP initiation criteria, or that are not between current flight level and desired flight level, are identified in grey. The ITP procedure requires reference aircraft to be within two flight levels of the ownship current flight level (i.e., the relative altitude criteria). Aircraft that are more than two flight levels away are colored in grey in this step of the process. The processor 24 determines which aircraft within the intervening flight levels are valid (ADS-B equipment, ITP distance, ground speed differential, relative altitude criteria). In another embodiment, the processor 24 automatically selects valid reference aircraft located within the intervening flight levels and populates the window 170 accordingly. If only one or two valid reference aircraft exist within the intervening flight levels, all are automatically selected. If more than two valid aircraft exist within the intervening flight levels, the processor 24 selects the two aircraft that are the closest to the host aircraft. Once an aircraft icon has been manually or automatically selected, it is indicated in green in the ITP view. A user or pilot can override any automatic selection made by the processor 24.

Figure 13:
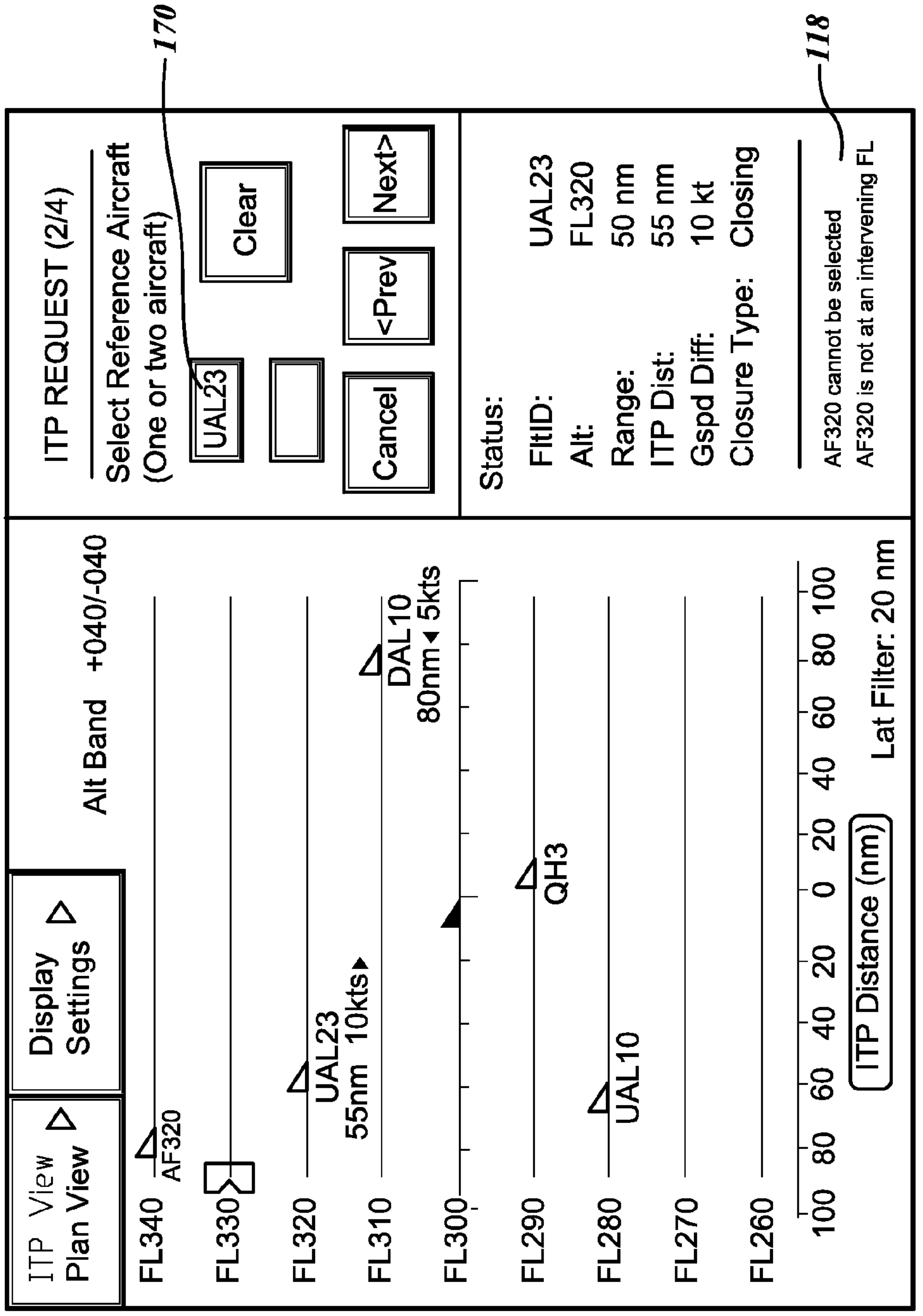

FIG. 13 illustrates when a user selects an aircraft AF320 that is outside of the intervening flight levels. In this situation, the selected aircraft AF320 is not inserted into the selected reference aircraft window 170 and the advisory message section 118 indicates why this is an invalid selection.

Figure 14:
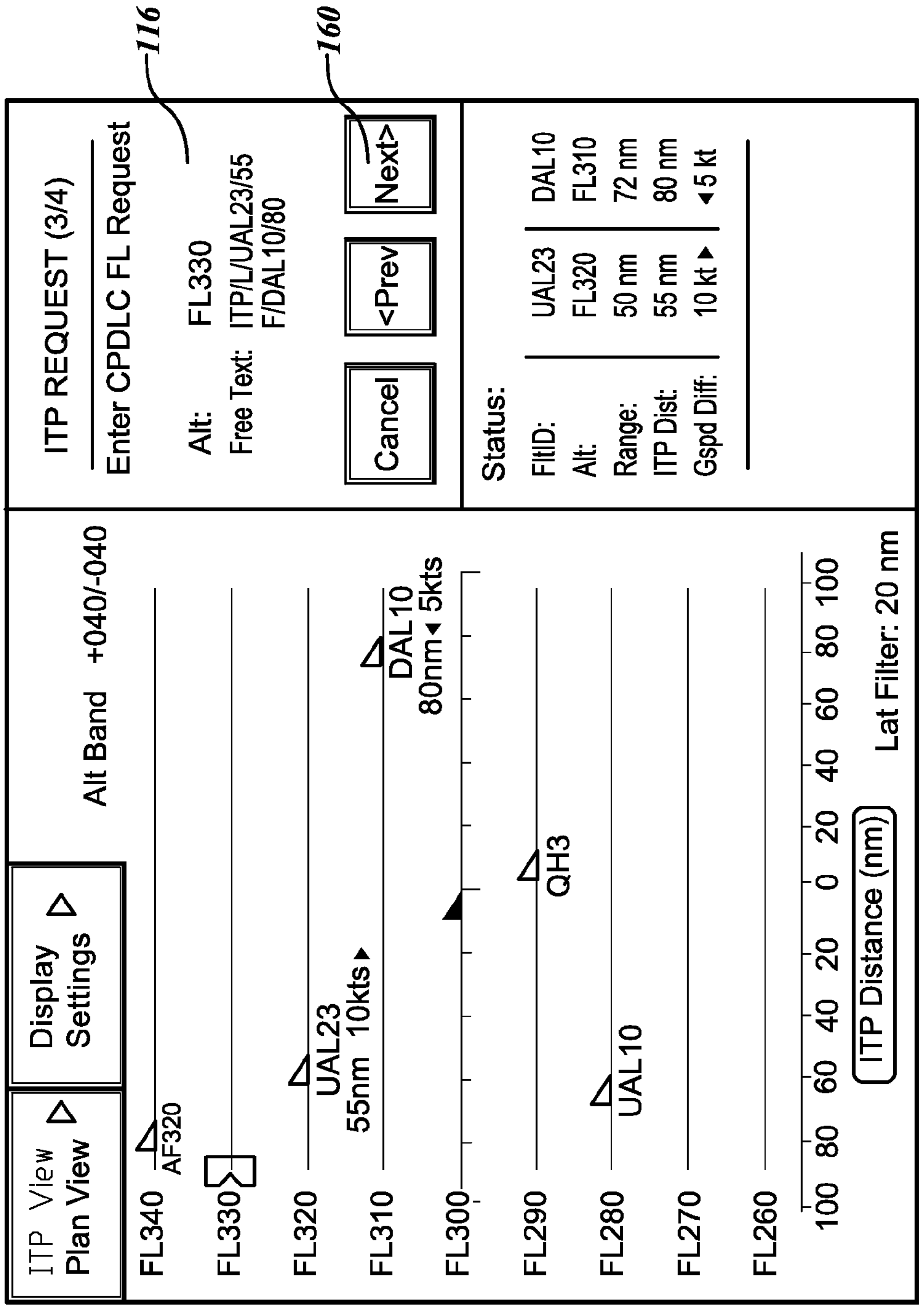
Figure 15:
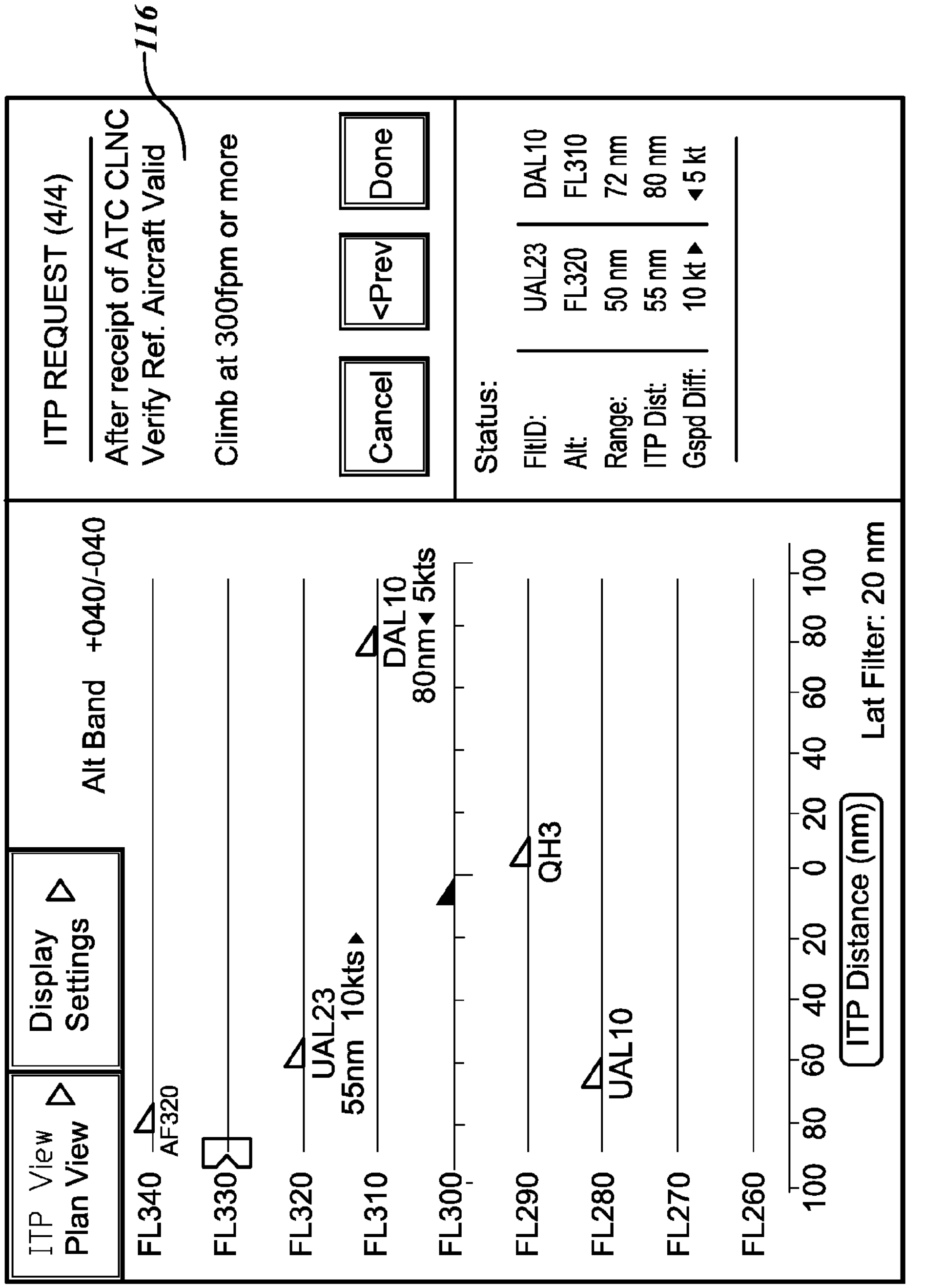

After manual or automatic selection of reference aircraft and activation of the Next view button 160, the process continues on to the third step of the ITP request process as shown in FIG. 14. The processor 24 generates and displays ITP clearance request text based on the selected valid reference aircraft and the selected valid flight level. The ITP clearance request text is displayed within the ITP guidance section 116. The format of the clearance request text is consistent with recent International Civil Aviation Organization (ICAO) standards. The ITP clearance request text includes an altitude value, in this example FL 330 and free text which is formatted accordingly. Then, the pilot either manually enters the clearance text into a data link interface (e.g. communications system 32) or the processor 24 uploads the clearance request text automatically and transmits it to the ATC via the communications system 32. A Controller Pilot Data Link Communications (CPDLC) application is included for sending requests to and receive clearances from ATC. The CPDLC is typically hosted in a Multi-Function Display (MFD) or a Flight Management System (FMS) Control Display Unit (CDU). Manual ITP flight level change requests are made via data link in a manner similar to a standard flight level change request, but with additional ITP-specific information entered in the free text fields. This information may be entered on more than one free text line if necessary. If an automatic transmission of the ITP clearance request is implemented within the ITP guidance section 116 (instead of FMS CDU or MFD implementation), a "SEND" control is implemented in step 3 of the ITP process. The control is preferably positioned adjacent to the free text data. The altitude request (e.g., Climb to FL 360) is appended to the ITP free text clearance data. The ITP free text data in any implementation would be formatted according to ICAO standards. After transmission of the ITP clearance request, the processor 24 presents pilot responsibilities while awaiting ATC clearance and what is to be performed once clearance is received. This information is presented in the ITP guidance section 116, see FIG. 15.

Figure 16:
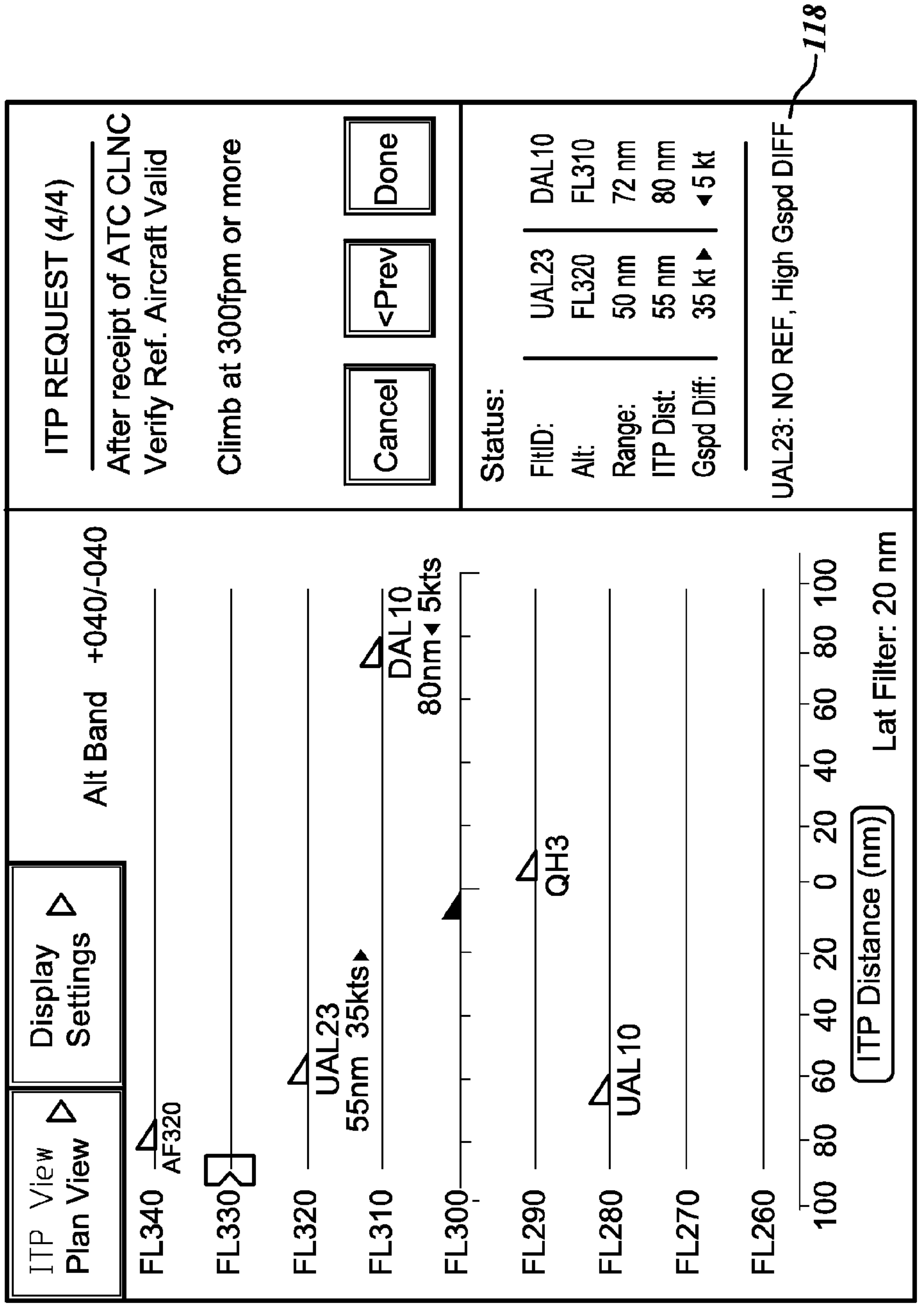

FIG. 16 illustrates when one or more of the selected reference aircraft fail to satisfy ITP criteria after the clearance has been requested and sent to ATC. The processor 24 changes the display of the reference aircraft that now fails to satisfy ITP initiation criteria. In this example, the icon and associated tag information associated with the now failing reference aircraft turn to blue. Also, the advisory message section 118 provides information why the reference aircraft fails to satisfy the ITP criteria. In one embodiment, the processor 24 generates an auditory message that is outputted via headphones or speakers within the cockpit for advising the pilot that they must verify the ITP criteria for reference aircraft. Other warnings may be provided.

In an alternative embodiment, step 4 of the ITP procedure guidance is only displayed to the user once the ITP climb/descent has started. It provides guidance on the necessary pilot actions (e.g., climb at 300 fpm or more, maintain constant cruise Mach number). In addition, visual and aural annunciations are provided if any necessary ITP conditions are breached during the ITP maneuver (e.g. less than 10 NM ITP distance). In one embodiment, the ITP reference aircraft transition from green to blue color and an ITP advisory message such as "ITP Distance<10 NM, Contact ATC" is provided in the advisory message section 118. An aural alert could also be provided simultaneously.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method comprising:
receiving, at a user interface located on a host aircraft, a first user selection of one or more display parameters;
receiving target aircraft information from a communications system on the host aircraft;
generating a graphical user interface display for presentation on a display coupled to a processing device on the host aircraft, the graphical user interface display comprising:
a main section configured to present one of a plan view or In-Trail Procedure (ITP) vertical profile view;
an ITP procedural guidance section;
a target status section; and
an ITP advisory message section, wherein one or more target icons based on the target aircraft information and the one or more display parameters are presented in the main section, and wherein the ITP vertical profile view includes ITP distance information; and
receiving a second user selection of a selected desired flight level from a plurality of desired flight levels.

2. The method of claim 1, further comprising:
uniquely identifying a current flight level of the host aircraft;
responsive to determining that all participating target aircraft within a predefined lateral envelope relative to the host aircraft, between the current flight level of the host aircraft and the selected desired flight level, satisfy ITP initiation criteria, uniquely identifying in a first way at least one of the selected desired flight level or target icons associated with target aircraft that are located between the current flight level of the host aircraft and the selected desired flight level from other target icons; and
responsive to determining that one of the participating target aircraft within the predefined lateral envelope relative to the host aircraft, between the current flight level of the host aircraft and the selected desired flight level, does not satisfy ITP initiation criteria, uniquely identifying in a second way another desired flight level from the plurality of desired flight levels or target icons associated with target aircraft that are located between the current flight level of the host aircraft and the selected desired flight level from other target icons.

3. The method of claim 1, further comprising automatically formulating ITP clearance text and displaying the ITP clearance text in the ITP procedural guidance section based on the selected desired flight level and at least one of an automatic selection or a manual selection of one or more target aircraft icons displayed on the ITP vertical profile view between the current flight level of the host aircraft and the selected desired flight level, wherein the target aircraft icons are associated with target aircraft located within a predefined lateral envelope of the host aircraft and the target aircraft satisfy ITP initiation criteria.

4. The method of claim 3, further comprising automatically sending a request for altitude change based on the ITP clearance text.

5. The method of claim 4, further comprising outputting at least one of a visual alert or an audible alert if the target aircraft included in the ITP clearance text fails to satisfy the ITP initiation criteria.

6. The method of claim 3, further comprising displaying post ITP clearance approval instructions in the ITP procedural guidance section.

7. The method of claim 1, further comprising uniquely identifying target aircraft icons each associated with respective target aircraft that does not satisfy ITP initiation criteria.

8. The method of claim 1, wherein the one or more display parameters comprise a lateral envelope and a vertical envelope.

9. The method of claim 1, further comprising:

receiving a user selection of a target aircraft icon displayed in the main section;

displaying information in the target status section, the information relating to a target aircraft associated with the selected target aircraft icon.

10. The method of claim 9, wherein the displayed information comprises at least one of flight identification, altitude, range, ITP distance, ground speed differential and groundspeed differential indicator with the host aircraft.

11. The method of claim 10, further comprising displaying information in the ITP advisory message section responsive to determining that the target aircraft fails to satisfy ITP initiation criteria.

12. A system comprising a processor configured to:

receive, at a user interface located on a host aircraft, a first user selection of one or more display parameters;

receive target aircraft information from a communications system on the host aircraft;

generate a graphical user interface display for presentation at a display coupled to a processing device of the host aircraft, the graphical user interface display comprising:

a main section configured to present one of a plan view or In-Trail Procedure (ITP) vertical profile view;

an ITP procedural guidance section;

a target status section; and an ITP advisory message section, wherein one or more target icons based on the target aircraft information and the one or more display parameters are presented in the main section, and wherein the ITP vertical profile view includes ITP distance information; and receive a second user selection of a selected desired flight level from a plurality of desired flight levels.

13. The system of claim 12, wherein the processor is further configured to:

uniquely identify a current flight level of the host aircraft;

uniquely identify in a first way at least one of the selected desired flight level or target icons associated with target aircraft that are located between the current flight level of the host aircraft and the selected desired flight level from other target icons, responsive to determining that all participating target aircraft within a predefined lateral envelope of the host aircraft, between the current flight level of the host aircraft and the selected desired flight level satisfy ITP initiation criteria; and uniquely identify in a second way another desired flight level from the plurality of desired flight levels or target icons associated with target aircraft that are located between the current flight level of the host aircraft and the selected desired flight level from other target icons, responsive to determining that one or more of the participating target aircraft within the predefined lateral envelope relative to the host aircraft, between the current flight level of the host aircraft and the selected desired flight level does not satisfy ITP initiation criteria.

14. The system of claim 12, wherein the processor is further configured to automatically formulate ITP clearance text and display the ITP clearance text in the ITP procedural guidance section based on the selected desired flight level and at least one of an automatic selection or a manual selection of one or more target aircraft icons displayed on the ITP vertical profile view between the current flight level of the host aircraft and the selected desired flight level, wherein the target aircraft icons are associated with target aircraft located within a predefined lateral envelope of the host aircraft and the target aircraft satisfy ITP initiation criteria.

15. The system of claim 14, wherein the processor is further configured to display post ITP clearance approval instructions in the ITP procedural guidance section.

16. The system of claim 15, wherein the processor is further configured to output at least one of a visual alert or an audible alert if the target aircraft included in the ITP clearance text fails to satisfy the ITP initiation criteria.

17. The system of claim 14, wherein the processor is further configured to automatically send a request for altitude change based on the ITP clearance text.

18. The system of claim 12, wherein the processor is further configured to uniquely identify target aircraft icons each associated with respective target aircraft that does not satisfy ITP initiation criteria.

19. The system of claim 12, wherein the one or more display parameters comprise a lateral envelope and a vertical envelope.

20. The system of claim 19, wherein the displayed information comprises at least one of flight identification (ID), altitude, range, ITP distance, ground speed differential, and groundspeed differential indicator with the host aircraft, wherein the processor is further configured to display information in the ITP advisory message section if the associated target aircraft fails to satisfy ITP initiation criteria.

* * * * *